(12) United States Patent
Kamiyama et al.

(10) Patent No.: US 8,025,461 B2
(45) Date of Patent: *Sep. 27, 2011

(54) LINING MATERIAL AND PIPELINE LINING METHOD

(75) Inventors: Takao Kamiyama, Hiratsuka (JP); Koji Kaneta, Hiratsuka (JP); Kenji Fujii, Hiratsuka (JP); Fuminori Tanaka, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 495 days.

This patent is subject to a terminal disclaimer.

(21) Appl. No.: 12/150,651

(22) Filed: Apr. 30, 2008

(65) Prior Publication Data

US 2009/0208291 A1    Aug. 20, 2009

(30) Foreign Application Priority Data

Feb. 20, 2008    (JP) ................. 2008-038152

(51) Int. Cl.
*F16L 55/16* (2006.01)

(52) U.S. Cl. ............ 405/184.2; 405/150.1; 138/97; 138/98; 156/187; 156/292; 264/516

(58) Field of Classification Search ............ 405/184.1, 405/184.2; 138/97, 98, 118, 172, DIG. 7; 156/292, 274.2, 287, 294, 187; 264/36, 516
See application file for complete search history.

(56) References Cited

U.S. PATENT DOCUMENTS

| | | | | |
|---|---|---|---|---|
| 3,894,328 A * | 7/1975 | Jansson | ................... | 29/451 |
| 4,207,130 A * | 6/1980 | Barber | ................... | 156/244.13 |
| 4,880,035 A * | 11/1989 | Vetter | ................... | 138/99 |
| 5,034,180 A * | 7/1991 | Steketee, Jr. | ................... | 264/516 |
| 5,385,173 A * | 1/1995 | Gargiulo | ................... | 138/98 |
| 5,487,411 A * | 1/1996 | Goncalves | ................... | 138/98 |
| 5,698,056 A * | 12/1997 | Kamiyama et al. | ................... | 156/218 |
| 5,765,597 A * | 6/1998 | Kiest et al. | ................... | 138/98 |
| 5,810,053 A * | 9/1998 | Mandich | ................... | 138/98 |
| 5,861,116 A * | 1/1999 | Mandich | ................... | 264/35 |
| 5,950,682 A * | 9/1999 | Kiest, Jr. | ................... | 138/98 |
| 5,964,249 A * | 10/1999 | Kiest, Jr. | ................... | 138/98 |
| 6,019,136 A * | 2/2000 | Walsh et al. | ................... | 138/98 |
| 6,146,491 A * | 11/2000 | Wood et al. | ................... | 156/344 |
| 6,723,266 B1 * | 4/2004 | Lippiatt | ................... | 264/173.17 |
| 7,258,141 B2 * | 8/2007 | Catha et al. | ................... | 138/98 |

* cited by examiner

*Primary Examiner* — Tara Mayo-Pinnock
(74) *Attorney, Agent, or Firm* — Adams & Wilks

(57) ABSTRACT

A lining material has a flexible tubular lining material impregnated with a thermosetting resin and having first and second sides. A first elastic and rigid strip member is removably attached to the first side of the flexible tubular lining material so as to extend along a substantially entire length of the flexible tubular lining material. A second elastic and rigid strip member is removably attached to the second side of the flexible tubular lining material so as to extend along the substantially entire length of the flexible tubular lining material. A third elastic and rigid strip member is attached to one end of the flexible tubular lining material and to the first and second elastic and rigid strip members.

20 Claims, 10 Drawing Sheets

LINING MATERIAL AND PIPELINE LINING METHOD

BACKGROUND OF THE INVENTION

1. Field of the Invention

The present invention relates to a lining material used to line pipelines in order to repair an aged pipeline, and a pipeline lining method using the same.

2. Description of the Prior Art

When a communications pipe, gas pipe, sewer pipe, water pipe, electrical pipe, or other pipeline buried under ground has aged and a pipe in the pipeline is to be repaired without the pipe being removed from the ground, pipeline lining methods are used in which a tubular pipe lining material impregnated with a thermosetting resin is inserted into the pipeline by pushing or drawing, the lining material is heated while being expanded by air pressure or the like and pressed against an inner peripheral surface of the pipeline, and the thermosetting resin of the lining material is cured to line the pipeline. Air pressure is used to evert and insert the lining material into the pipeline (e.g., Japanese Laid-open Patent Application No. 2006-123547).

However, in the conventional insertion method for a lining material, insertion in pipelines is extremely difficult in sections that are bent at a right angle or close to a right angle. Specifically, with the method in which the material is pushed in while being everted, the eversion does not occur in the sections bent at a right angle or close to a right angle. Furthermore, with a drawing-in method, the contact resistance of the lining material increases as the bent sections increase, and the lining material therefore becomes heavier and is unable to be drawn in. If drawing in continued forcibly, the lining material is stretched and damaged, which dramatically reduces the product quality of the lining material.

An object of the present invention is to provide a lining material capable of being easily and smoothly inserted into a pipeline even where there is a plurality of sections bent at a right angle or close to a right angle, and to provide a pipeline lining method using the same.

SUMMARY OF THE INVENTION

The lining material of the present invention is a flexible tubular lining material impregnated with thermosetting resin, wherein a first elastic and rigid strip member is fixedly attached to one end of the lining material. Furthermore, second and third elastic and rigid members are removably attached on one side of the lining material and on the other side thereof, respectively.

A pipeline lining method according to the invention uses a flexible tubular lining material impregnated with thermosetting resin and comprises the steps: fixedly attaching an elastic and rigid strip member to one end of the lining material; drawing or inserting into a pipeline the lining material with the elastic and rigid strip member attached thereto; removing and extracting the elastic and rigid strip member from the lining material while retaining the lining material inside the pipeline; and subjecting the lining material to pressure to cause it to expand against an inner peripheral surface of the pipeline and heating the lining material to cause the thermosetting resin to be cured.

A pipeline lining method according to the invention also uses a flexible tubular lining material impregnated with thermosetting resin and comprises the steps: fixedly attaching a first elastic and rigid strip member to one end of the lining material and removably attaching second and third elastic and rigid strip members on one side and on the other side of the lining material; drawing or inserting into a pipeline the lining material with the first to third elastic and rigid strip members attached; removing and extracting the first to third elastic and rigid strip members from the lining material while retaining the lining material inside the pipeline; and subjecting the lining material to pressure to cause it to expand against an inner peripheral surface of the pipeline and heating the lining material to cause the thermosetting resin to be cured.

In the lining material of the present invention, the strip member imparts elasticity and rigidity to allow the trunk to be reinforced. Therefore, the lining material can be easily and smoothly inserted into a pipeline even where there is a plurality of sections bent at a right angle or close to a right angle, and it is possible to prevent the lining material from being stretched and damaged by forcible insertion. The lining material can be protected by the strip member during insertion, making it possible to prevent damage to the lining. The pipeline lining method of the present invention uses a lining material having a strip member of the present invention. Therefore, insertion of the lining material into a pipeline can be easily and smoothly performed, stretching and damage to the lining material can be prevented, and the time for lining work can be reduced.

Further features of the invention, its nature and various advantages will be more apparent from the accompanying drawings and following detailed description of the invention.

DESCRIPTION OF THE PREFERRED EMBODIMENTS

The present invention will now be described in detail with reference to the embodiments shown in the accompanying drawings.

Figure 1:
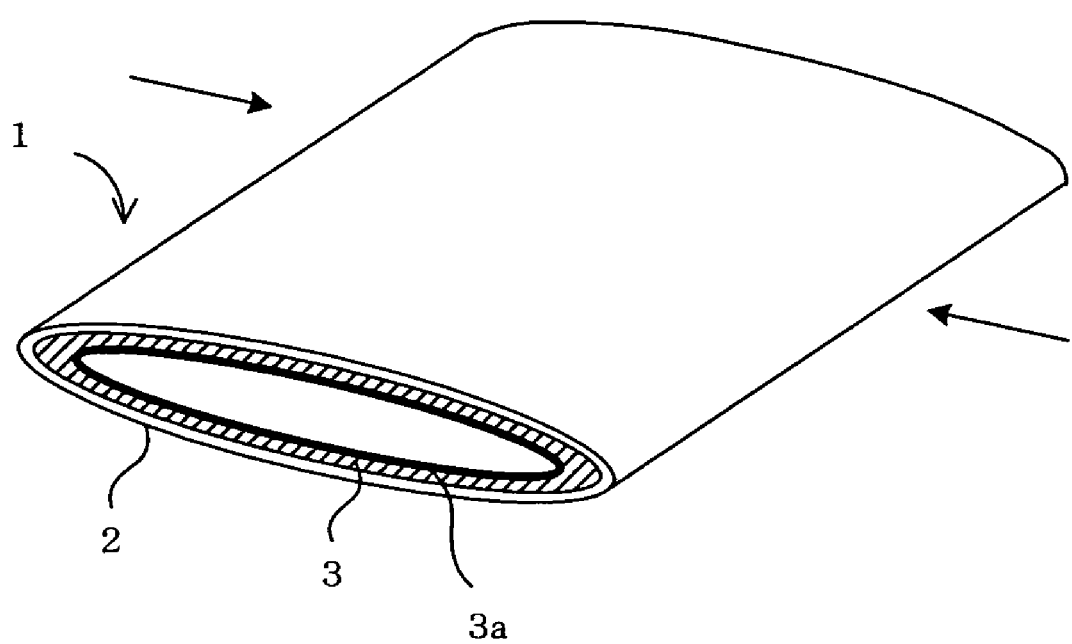
FIG. 1 is a schematic perspective view showing the structure of the lining material.

FIG. 1 shows a lining material used to repair pipelines. The lining material 1 is a flexible tubular material comprising a flexible cylindrical resin-absorbing material 3 of a non-woven fabric made of polyester, polypropylene, nylon, acrylic, vinylon, or the like whose exterior surface is covered by a flexible tube 2 of polyethylene, vinyl chloride or the like. The resin-absorbing material 3 is impregnated with an uncured liquid thermosetting resin such as unsaturated polyester resin, epoxy resin, or the like. The inner surface of the flexible cylindrical resin-absorbing material 3 is covered with a highly hermetic plastic film 3a of polyethylene, vinyl chloride or the like.

Figure 2:
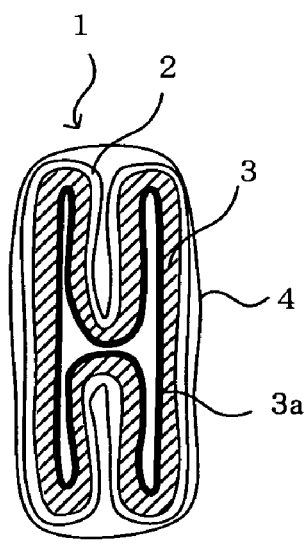
FIG. 2 is a cross-sectional view showing the lining material in FIG. 1 folded into the shape of an H and bound with a tape.
Figure 3:
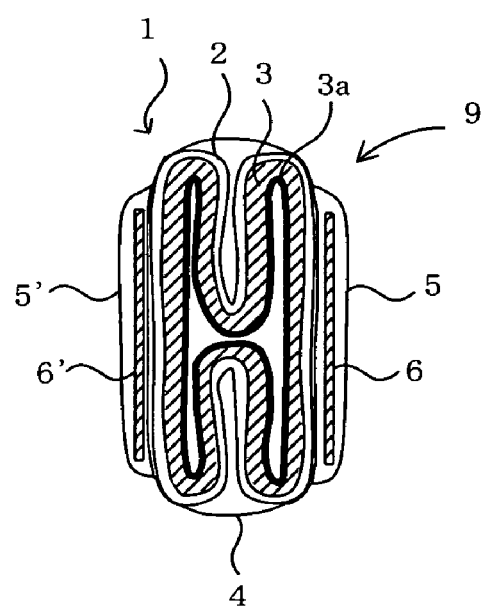
FIG. 3 is a cross-sectional view along the line A-A in FIG. 4, showing the belted lining material with steel belts attached on the lining material.
Figure 4:
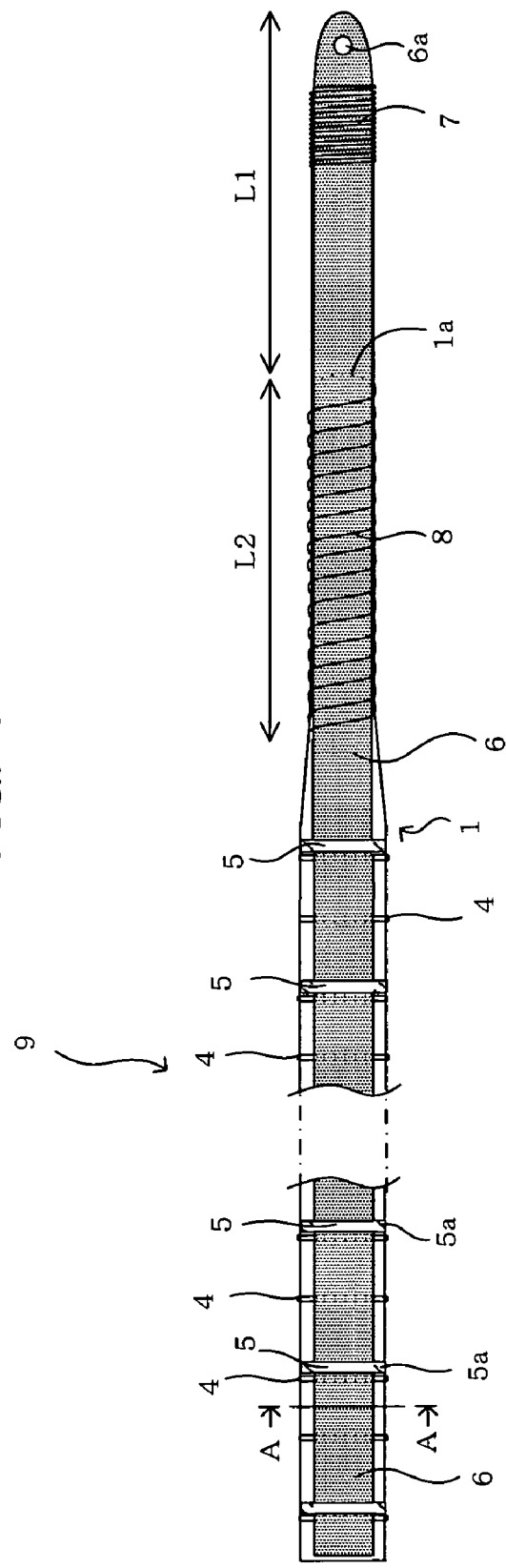
FIG. 4 is a side view showing the lining material with the steel belts attached.
Figure 5:
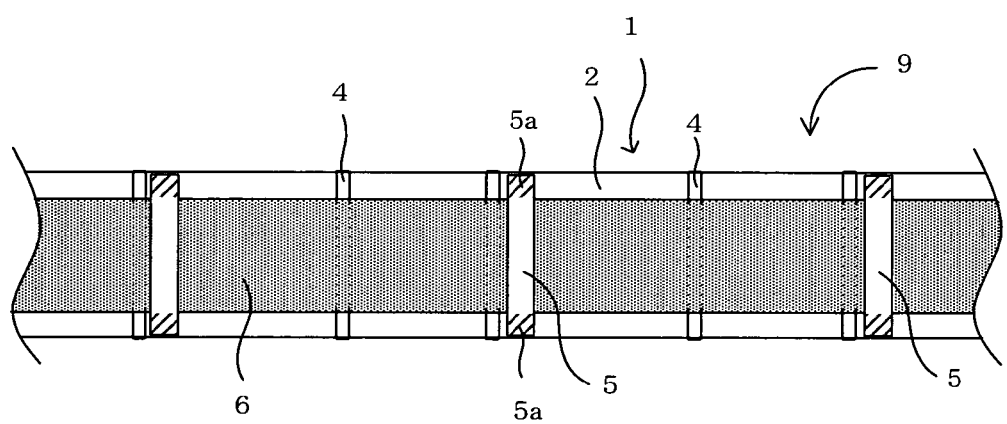
FIG. 5 is an enlarged side view of a portion of the belted lining material.

In the present embodiment, the lining material 1 is folded into the shape of an H and bound with a tape 4 (binding member) so as to provide a reduced width, as shown in FIG. 2, and steel belts 6 and 6' (first and second strip members) as shown in FIGS. 3 to 5 are removably attached to the folded lining material to provide a steel-belted lining material 9 (hereafter abbreviated as belted lining material) in order to facilitate the insertion of the lining material into the pipeline.

The steel belts 6 and 6' are elastic and rigid, impart elasticity and rigidity to the lining material 1, and reinforce the trunk of the lining material 1. The belts also partially cover and protect the lining material 1. The belts 6 and 6' are composed of a thin steel plate, but it may be composed of strips of steel wire bundled together and covered with rubber and the like.

An opening 6a is formed respectively in the tip of the steel belts 6 and 6' as shown in FIG. 4. This opening 6a is used to tie a rope or the like for pulling the belted lining material 9 when inserting the belted lining material 9 into a pipeline.

To fabricate the belted lining material 9, the lining material 1 is first folded, as shown in FIG. 2, so that the cross section is in the shape of an H. As shown in FIGS. 2 and 4, a tape 4 such as cellophane tape is wound around the width of the lining material 1 at a suitable interval of approximately several tens of centimeters in the lengthwise direction of the lining material 1 to bind the lining material 1. It is acceptable to bind the material with a string or other member instead of tape 4.

Folding the lining material 1 is not limited to the shape of an H, and any shape is acceptable as long as the material easily extends when made to expand into a cylindrical shape upon application of pressure after inserting the lining material 1 into the pipeline.

Next, as shown in FIGS. 3 through 5, belt loops 5 and 5' (loop members) for passing the steel belts 6 and 6' therethrough are attached on both sides in the lengthwise direction of the folded lining material 1 at suitable intervals, such as twice the interval of the tape 4. The belt loops 5 and 5' serve to guide the steel belt 6 and 6' therethrough with some space maintained and to prevent the steel belts 6 and 6' from shifting significantly from the lining material 1. The belt loops 5 and 5' are formed in a strip from a film such as polyethylene and the like, and both ends 5a of the belt loop 5 and 5' are secured by welding or the like to the exterior surface (the exterior surface of tube 2) of the folded lining material 1.

Next, as shown in FIGS. 3 through 5, the steel belts 6 and 6' are attached to each side surface in the lengthwise direction of the lining material 1 so as to sandwich the lining material 1. For this purpose, one steel belt 6 is inserted into the belt loops 5 on one side of the lining material 1 and the other steel belt 6' into the belt loops 5' on the other side thereof. As shown in FIG. 4, the ends of each steel belt extend a suitable length L1 (e.g., approximately 30 centimeters) from the end 1a of the lining material 1, and the steel belts 6 and 6' are fixed at the ends by being bound with a strong thread 7. A strong thread 8 is also used to wrap and tie the steel belts 6, 6' and the lining material 1 at the section extending a length of L2 (e.g., approximately 30 centimeters) from the end 1a of the lining material 1 in the direction opposite to the tip of the steel belt 6 and 6'. It is acceptable to use other materials such as string instead of the threads 7 and 8. This completes the belted lining material 9.

If the threads 7 and 8 are cut in the belted lining material 9, the bond between the ends of the steel belt 6 and 6' and the bond between the steel belts 6 and 6' and the end of the lining material 1 is disconnected. If each end of the steel belts 6 and 6' is pulled, the steel belts 6 and 6' can be pulled through each belt loop and removed from the lining material 1.

The belt loops 5 and 5' can be attached to the lining material 1 from the top of the steel belts 6 and 6' after the ends of the steel belts 6, 6' and the end of the lining material 1 have been fixed.

Figure 6:
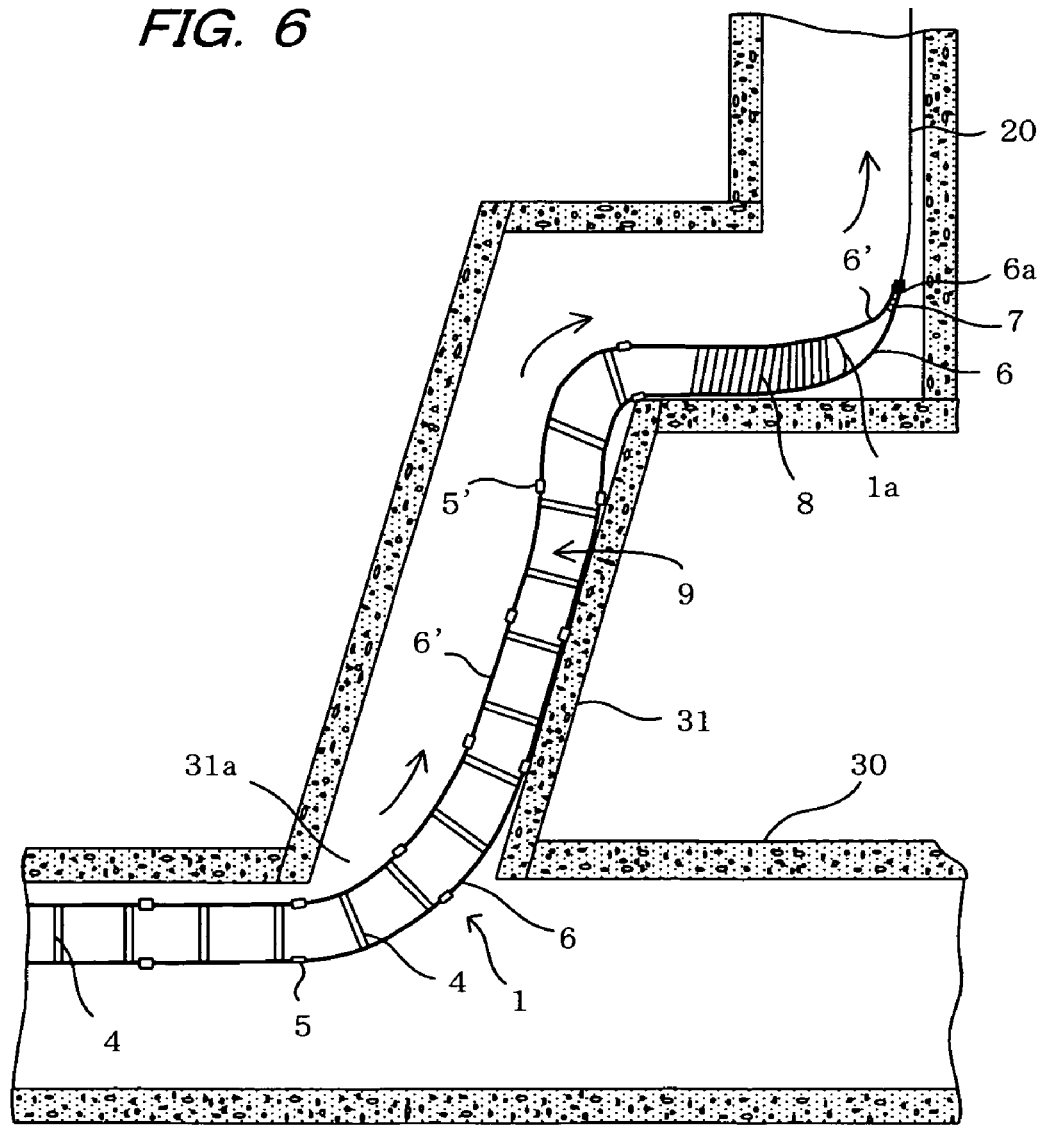
FIG. 6 is an illustrative view showing a state in which the belted lining material is inserted into the lateral pipe from the main pipe.

During the pipeline lining work, the belted lining material 9 prepared as indicated above is pushed or drawn into the pipeline, as shown in FIG. 6. If drawn in, the belted lining material 9 is tied with a rope or the like to the opening 6a on the ends of the steel belts 6 and 6' and is then pulled.

FIG. 6 shows the state where the belted lining material 9 is inserted into a bent lateral pipe 31 from a main pipe 30 of a pipeline. Compared to merely the lining material, the steel belts 6 and 6' impart elasticity and rigidity to the belted lining material 9, and reinforce the trunk. Furthermore, the width of the belted lining material 9 is narrower than the width of the original lining material 1 because it is folded. In particular, the section having a length of L1 from the end of the steel belt 6 does not sandwich the lining material, provides enhanced elasticity and flexibility, and easily bends in accordance with the bent sections of the pipeline that are bent at a right angle or close to a right angle, and fulfills the role of guiding subsequent sections.

Even if there is a plurality of locations that are bent at a right angle or close to a right angle in the lateral pipe 31, the contact resistance of the belted lining material 9 is low, the belted lining material 9 can be easily and smoothly inserted, and the time required for lining work can be reduced. Also, since the contact resistance is low and the steel belts 6 and 6' protects the lining material 1, it is possible to prevent stretching and damage to the lining material 1.

When insertion of the belted lining material 9 into the pipeline has been completed, the threads 7 and 8 at the ends of the belted lining material 9 are cut, which disconnects the bond between the ends of the steel belts 6 and 6' and the bond between the steel belts and the end of the lining material 1. If the two ends of the steel belts 6 and 6' are pulled, the steel belts 6 and 6' can be slid against the lining material 1 inside the pipeline. This allows the steel belts 6 and 6' to be pulled and extracted from the pipeline and the lining material 1 to be left inside the pipeline.

Next, the lining material 1 remaining inside the pipeline is made to expand via application of pressure from the inside, such as air pressure or the like. The strength of the tape 4 is set so that the tape 4 can be cut with the increased pressure at this point. The tape 4 is thus cut by the increased pressure, and the lining material 1 folded and bound by the tape 4 spreads out and expands into a cylindrical shape and is pressed against the inner peripheral surface of the pipeline. In this state, the lining material 1 is heated by a hot water shower or steam, the thermosetting resin impregnated into the lining material 1 is cured, and the pipeline is lined.

According to the embodiment as described above, the lining material can be easily and smoothly inserted into a pipeline with a plurality of locations that, as indicated above, are bent at a right angle or close to a right angle, and the time for lining work can be reduced. Also, stretching and damage can be prevented during insertion of the lining material, thus protecting the quality of the lining material.

Figure 7:
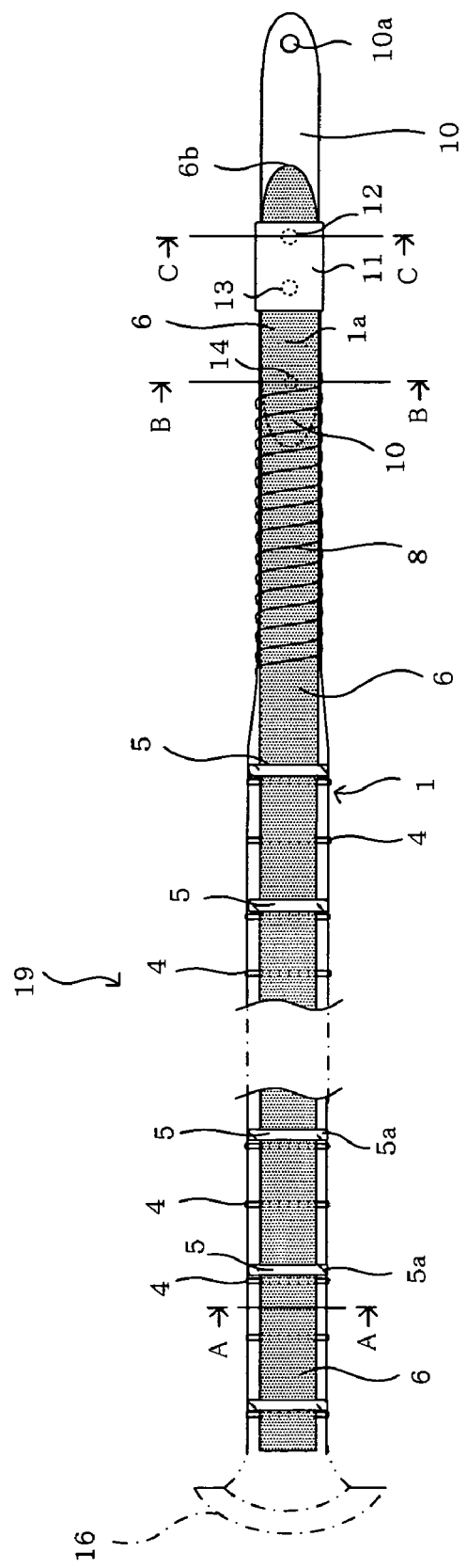
FIG. 7 is a side view showing another embodiment of the lining material with the steel belts attached.
Figure 8A:
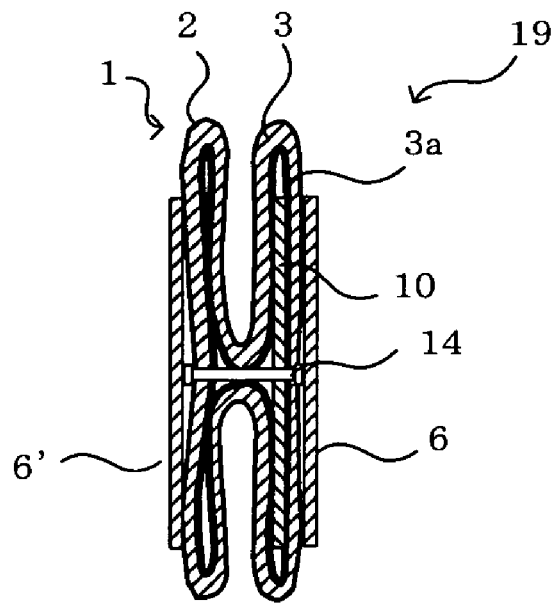
FIG. 8a is a cross-sectional view along the line B-B in FIG. 7.
Figure 8B:
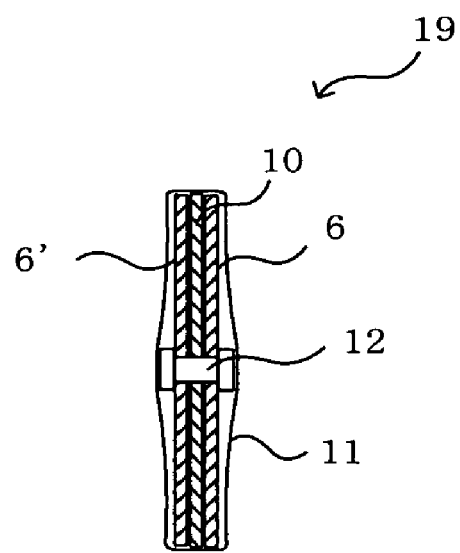
FIG. 8b is a cross-sectional view along the line C-C in FIG. 7.

FIGS. 7, 8a and 8b show another embodiment of a belted lining material, denoted by the numerical symbol 19. Portions similar to those of the belted lining material 9 shown in FIGS. 3 through 5 are denoted by the same numerical symbols and are not described.

In the belted lining material 19 shown in FIGS. 7 and 8a, one end (tip end) 1a of the lining material 1 as seen in the lengthwise direction (length direction of the pipe) is linked using a rivet 14 or another such coupling implement with one end of another steel belt 10 (third strip member) having elasticity and rigidity in order to guide the lining material 1. A hole 10a for fastening a drawing rope 20 is formed in the other end of the steel belt 10. The steel belts 6 and 6' sandwiching the lining material 1 extend further than the tip end portion 1a of the lining material 1. The tip ends 6b of the steel belts 6 and 6' extend to the substantial center of the steel belt 10, and the steel belts 6, 6' are fixed to the steel belt 10 in the center of the steel belt 10 via rivets 12, 13 or other such coupling implements (FIG. 8b). The rivets 12, 13 are covered using a plastic tape 11 having a smooth surface in order to prevent the rivets 12, 13 from coming into contact with the inner wall of a pipe and failing to be smoothly drawn in when the belted lining material 19 is inserted into a pipe. Since the steel belt 10 and the steel belts 6, 6' are linked by rivets or the like, the linked portions can be prevented from losing elasticity in comparison with coupling using welding or another method.

As with the belted lining material 9, the steel belts 6, 6' are bound to the tip end portion of the lining material 1 with a strong thread 8, and the lining material 1 and the steel belts 6, 6' are fixed to each other so as to not separate.

In cases in which this type of belted lining material 19 is used as a lining material for a lateral pipe, a flange-like collar is formed at the back end of the lining material 1, and this collar is depicted by the imaginary line 16 in FIG. 7.

This type of belted lining material 19 is inserted from the tip end into a pipe by being pushed or drawn in, similar to the belted lining material 9.

Figure 9:
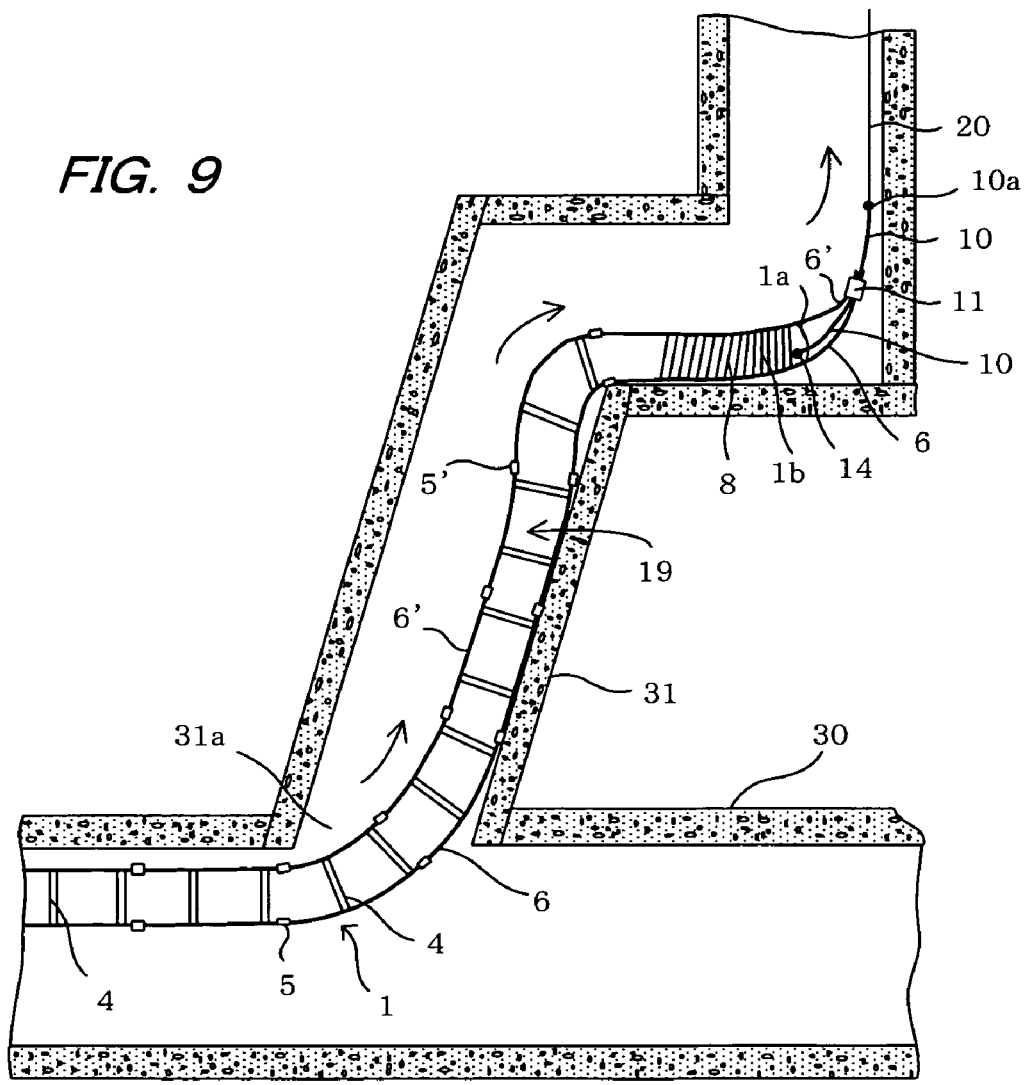
FIG. 9 is an illustrative view showing a state in which the belted lining material in FIG. 7 is inserted into the lateral pipe from the main pipe.

FIG. 9 shows the manner in which the belted lining material 19 is inserted from the main pipe 30 into the bent lateral pipe 31 via a lateral pipe opening 31a.

In FIG. 9, the belted lining material 19 is drawn into the lateral pipe 31 via the lateral pipe opening 31a by fastening the drawing rope 20 in the hole 10a of the steel belt 10 and winding up the drawing rope 20 from above ground.

The belted lining material 19 is further drawn in until the tip end of the lining material 1 appears above ground. The thread 8 is then cut to undo the link between the steel belts 6, 6' and the lining material 1, and the lining material 1 is cut at the portion 1b so as to be disconnected from the steel belt 10. If the steel belt 10 is pulled, the steel belts 6, 6' can be pulled out of the belt loops 5, 5' and removed from the lining material 1.

The lining material 1 remaining in the lateral pipe is then subjected to air pressure or the like from the inside and made to expand. At this time, the tape 4 is cut by the application of pressure, and the folded lining material 1 widens and expands into a tubular shape and comes into pressured contact with the internal peripheral surface of the lateral pipe 31. In this state, the lining material 1 is heated by hot water, steam, or another such heating medium, and the thermosetting resin impregnated in the lining material 1 is cured, thus lining the lateral pipe.

This type of belted lining material 19, as compared with the belted lining material 9, can be readily inserted with minimal obstruction into a lateral pipe having a large number of sections bent at a right angle or approximately a right angle. This is because the lining material 1 is directly fixed via the coupling implement 14 to the steel belt 10, and the lining material 1 can be directly pulled via the steel belt 10.

The drawing in or pushing in of the entire lining material is also more reliable because the steel belts 6, 6' attached at both sides of the lining material are linked to the steel belt 10 for guiding the lining material 1.

Since the steel belts 6, 6' impart overall elasticity and rigidity to strengthen the trunk, the lining material can be readily and smoothly inserted into a pipe having a large number of sections bent at a right angle or approximately a right angle, and damage to the lining material can be prevented because the lining material is protected by the steel belts 6, 6' while being inserted into the pipe.

Figure 10:
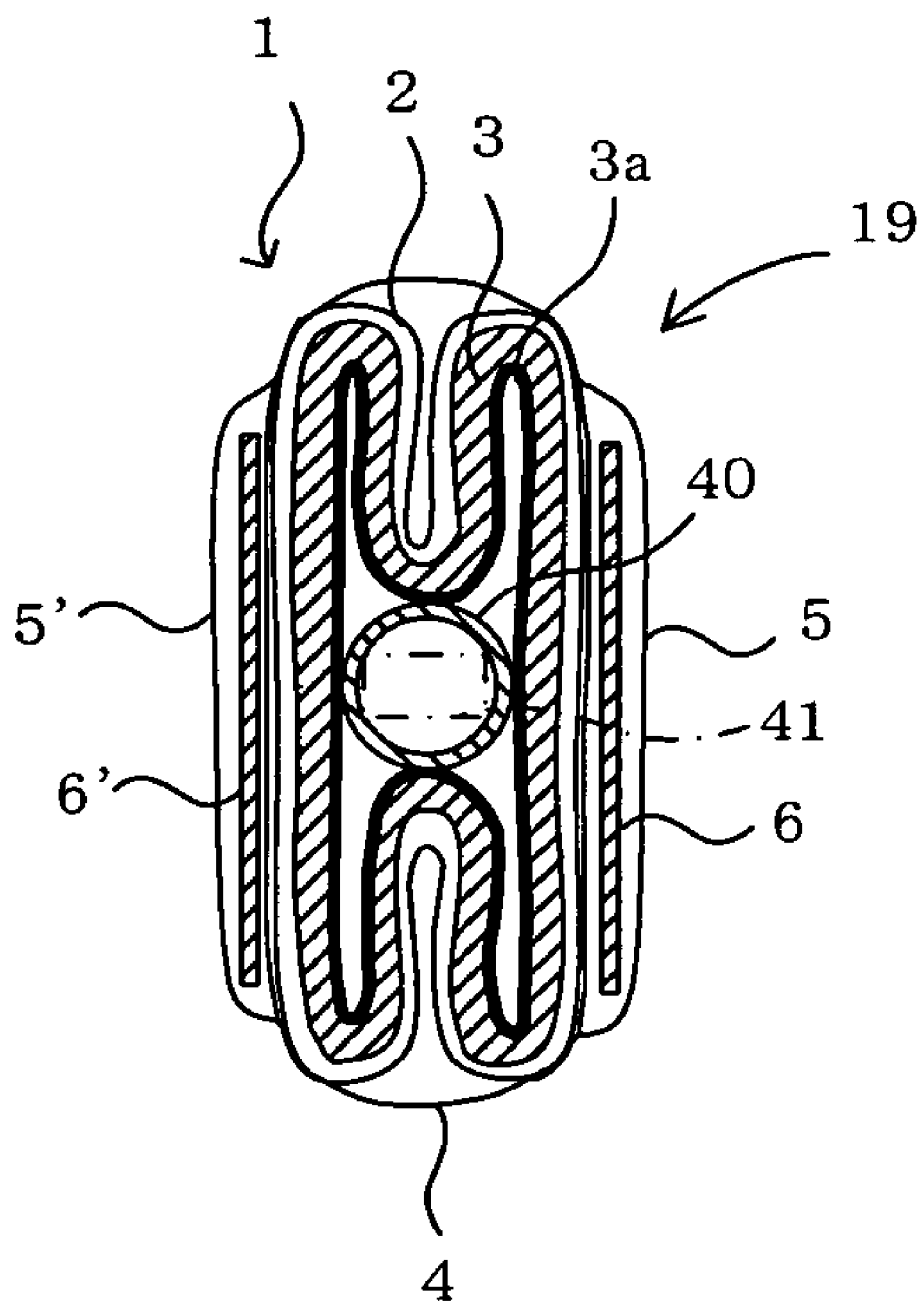
FIG. 10 is a cross-sectional view corresponding to FIG. 3, showing the belted lining material with steel belts attached on the lining material and with a hose accommodated therein.
Figure 11:
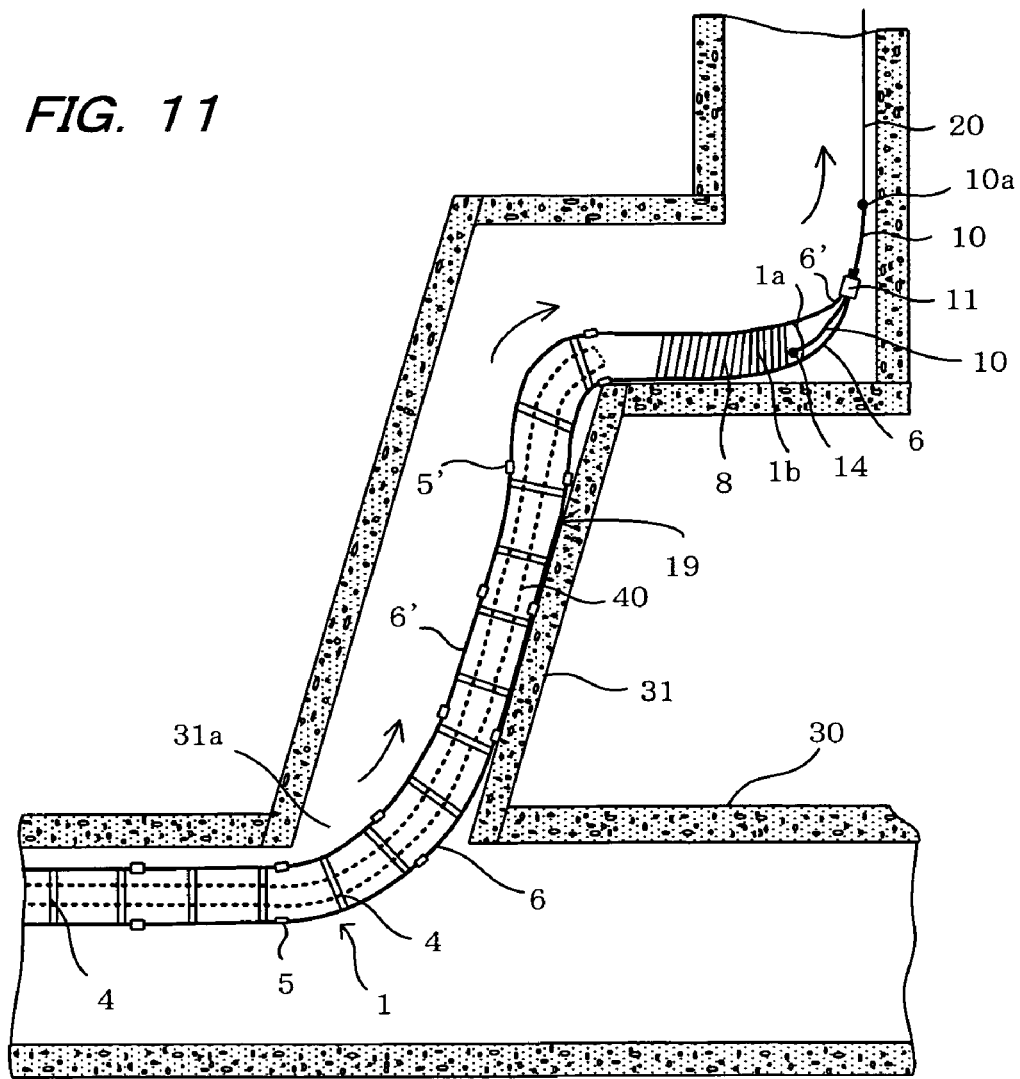
FIG. 11 is an illustrative view showing a state in which the belted lining material in FIG. 10 is inserted into the lateral pipe from the main pipe.

A hose for guiding hot water, steam, or another such heating medium for curing the thermosetting resin impregnated in the lining material can be provided in the interior of the belted lining material 9 or 19. An example of this is shown in FIGS. 10 and 11. A belted lining material houses a hose 40 of a substantially equal length to the lining material 19, as shown in FIGS. 10 and 11. After insertion of the belted lining material 19 into the pipe is complete, the lining material 1 is left in the pipe while the steel belts 6, 6' are pulled out of the pipe, and pressure is applied to the lining material 1 to bring it into pressured contact with the internal peripheral surface of the pipe; hot water, steam, or another such heating medium is supplied from the end of the hose 40 nearer the main pipe. Since the main pipe 30 is plugged so that water may not flow, the heating medium discharged from the tip end of the hose 40 accumulates up to the lateral pipe 31. This causes the lining material 1 in the lateral pipe 31 to be heated to cure the thermosetting resin impregnated in the lining material 1 and line the lateral pipe 31. Preferably, the hose 40 may be provided with a large number of holes, and the heating medium may be blown out of these holes as a shower or mist onto the internal peripheral surface of the lining material 1 in pressure contact against the pipe internal peripheral surface in order to cure the lining material 1. In cases in which the heating medium is hot water, the hot water can also be circulated.

In cases in which the lateral pipe is bent, problems are encountered in that wrinkles form in the resin inside the lining material at the bent sections, making uniform lining impossible. Therefore, an elastic and rigid member (for example, steel) is inserted in advance into the hose 40 to impart elasticity and rigidity thereto, as shown by the imaginary lines 41 in FIG. 10. While the resin in the lining material is being cured, the hose 40 is moved up and down to rub against the internal peripheral surface of the lining material and stretch out the wrinkles that have formed in the resin in the lining material. This makes uniform lining in the pipe possible even when the pipe is bent.

According to the embodiment as described above, the steel belts 6 and 6' can be attached across the entire length of the lining material 1, or can be attached across a portion of the entire length of the lining material 1.

In the embodiment, two steel belts 6 and 6' are attached so as to sandwich the lining material 1, but it is acceptable to attach only one belt to one side of the lining material 1. It is also acceptable to attach three or more belts so as to enclose the lining material 1.

Furthermore, instead of the steel belt, another elastic and rigid belt member composed of a non-steel metal, plastic, or other material can be attached to the lining material 1.

The lining material of the present invention can be used not only as a lining for a communications pipe, gas pipe, sewer pipe, water pipe, electrical pipe, or other subterranean pipeline, but also as a lining for a communications pipe, gas pipe, sewer pipe, water pipe, electrical pipe, or other pipeline inside apartment buildings, office buildings, and other buildings.

What is claimed is:

1. A lining material comprising: a flexible tubular lining material impregnated with a thermosetting resin and having first and second sides; a first elastic and rigid strip member removably attached to the first side of the flexible tubular lining material so as to extend along a the entire length of the flexible tubular lining material; a second elastic and rigid strip member removably attached to the second side of the flexible tubular lining material so as to extend along the entire length of the flexible tubular lining material; and a third elastic and rigid strip member attached to one end of the flexible tubular lining material and to the first and second elastic and rigid strip members.

2. A lining material according to claim 1; wherein the third elastic and rigid strip member is connected to a tip end portion of each of the first and second elastic and rigid strip members.

3. A lining material according to claim 1; further comprising a tape that covers a portion at which the first and second elastic and rigid strip members are connected to the third elastic and rigid strip member.

4. A lining material according to claim 1; wherein the flexible tubular lining material is folded and bound by the first and second elastic and rigid strip members so as to provide a reduced width.

5. A lining material according to claim 4; wherein the flexible tubular lining material is folded into the shape of an H.

6. A lining material according to claim 1; wherein the third elastic and rigid strip member is a steel belt.

7. A lining material according to claim 1; wherein each of the first and second elastic and rigid strip members is a steel belt.

8. A lining material according to claim 1; wherein the flexible tubular lining material is configured to house a hose for guiding a heating medium that cures the thermosetting resin impregnated in the flexible tubular lining material.

9. A lining material according to claim 8; further comprising an elastic and rigid member inserted in the hose for imparting elasticity and rigidity to the hose.

10. A lining material according to claim 1; wherein the first and second elastic and rigid strip members are attached to a center portion of the third elastic and rigid strip member.

11. A lining material according to claim 10; wherein a tip portion of each of the first and second elastic and rigid strip members protrudes from a tip of the flexible tubular lining material and is attached to the center portion of the third elastic and rigid strip member.

12. A lining material according to claim 1; further comprising a plurality of loop members attached to the first and second sides of the flexible tubular lining material at preselected intervals in the lengthwise direction thereof; and wherein the first and second elastic and rigid strip members pass through the loop members on the respective first and second sides of the flexible tubular lining material.

13. A pipeline lining method using a flexible tubular lining material impregnated with a thermosetting resin, comprising the steps:

removably attaching first and second elastic and rigid strip members to respective opposite sides of the flexible tubular lining material, and fixedly attaching a third elastic and rigid strip member to one end of the flexible tubular lining material and to the first and second elastic and rigid strip members;

drawing or inserting into a pipeline the flexible tubular lining material with the first, second and third elastic and rigid strip members attached thereto;

removing and extracting the first, second and third elastic and rigid strip members from the flexible tubular lining material while retaining the flexible tubular lining material inside the pipeline; and subjecting the flexible tubular lining material to pressure to cause it to expand against an inner peripheral surface of the pipeline and heating the flexible tubular lining material to cause the thermosetting resin to be cured.

14. A method according to claim 13; wherein each of the first, second and third elastic and rigid strip members is a steel belt.

15. A method according to claim 13; wherein the removably attaching step comprises removably attaching each of the first and second rigid and elastic strip members to the opposite sides of the flexible tubular lining material so that a tip of each of the first and second rigid and elastic strip members protrudes from a tip of the flexible tubular lining material; and wherein the fixedly attaching step comprises fixedly attaching the third rigid and elastic strip member so that the tip of each of the first and second rigid and elastic strip members is attached to a center portion of the third elastic and rigid strip member.

16. A method according to claim 13; further comprising, prior to the removably attaching step, a step of attaching a plurality of loop members to the opposite sides of the flexible tubular lining material at preselected intervals in the lengthwise direction thereof; and wherein the removably attaching step comprises passing the first and second rigid and elastic strip members through the loop members on the respective opposite sides of the flexible tubular lining material.

17. A lining material for rehabilitating an existing pipeline, the lining material comprising:

first and second elastic and rigid strip members;

a flexible tubular body impregnated with a thermosetting resin and interposed between the strip members along the length of the flexible tubular body for imparting elasticity and rigidity to the flexible tubular body while inserting the flexible tubular body into an existing pipeline during a rehabilitating operation; and a third elastic and rigid strip member directly connected to an end of the flexible tubular body for guiding the flexible tubular body into the existing pipeline during the rehabilitating operation.

18. A lining material according to claim 17; further comprising a plurality of loop members attached to opposite sides of the flexible tubular body at preselected intervals in the lengthwise direction thereof so that the first and second elastic and rigid strip members pass through the loop members on the respective opposite sides of the flexible tubular body.

19. A lining material according to claim 17; wherein the first and second elastic and rigid strip members are attached to a center portion of the third elastic and rigid strip member.

20. A lining material according to claim 19; wherein a tip portion of each of the first and second elastic and rigid strip members protrudes from a tip of the flexible tubular body and is attached to the center portion of the third elastic and rigid strip member.

* * * * *